UNITED STATES PATENT OFFICE.

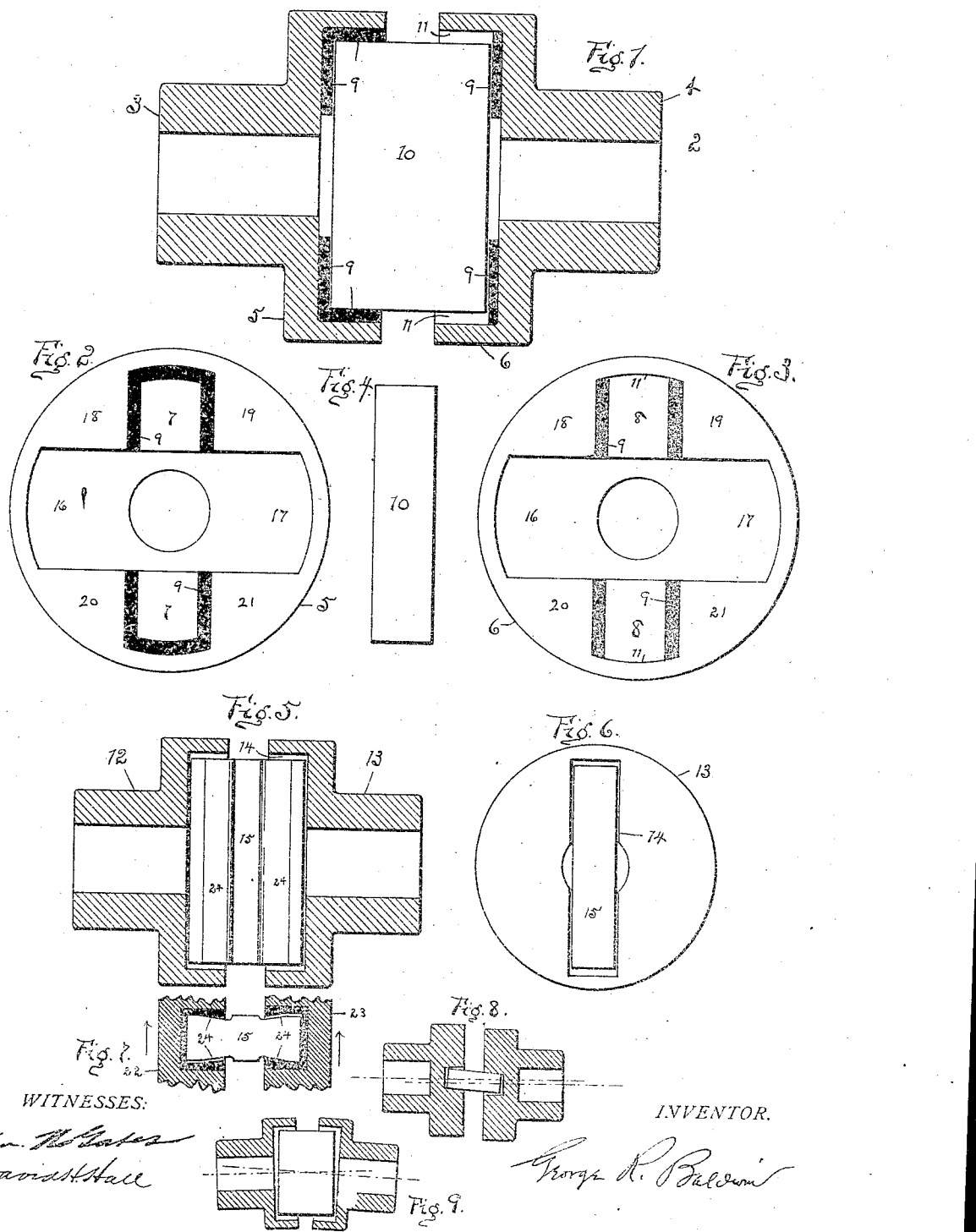

GEORGE R. BALDWIN, OF PHILADELPHIA, PENNSYLVANIA.

FLEXIBLE SHAFT-COUPLING.

1,220,310.

Specification of Letters Patent. Patented Mar. 27, 1917.

Application filed March 10, 1913. Serial No. 753,460.

*To all whom it may concern:*

Be it known that I, GEORGE R. BALDWIN, a citizen of the United States, residing at Philadelphia, in the county of Philadelphia and State of Pennsylvania, have invented certain new and useful Improvements in Flexible Shaft-Couplings, of which the following is a specification.

The object of my invention is to provide flexibility in a coupling for shafts out of true alinement and thereby prevent undue strains in the parts and undue pressure on the bearings.

Electrical insulation of one shaft from the other connected shaft is also obtained by my invention.

These objects I attain in the manner hereinafter set forth, reference being had to the accompanying drawings, in which—

Figure 1, is a view showing the two coupling halves in cross-section and the tilting bar in position between them and connecting them together.

Figs. 2 and 3, show the faces of the two coupling halves with the depressions or sockets therein for receiving the said tilting bar.

Fig. 4, shows a side or edge view of the tilting bar.

Figs. 1, 2 and 3 also show insulation located in the sockets between the tilting bar and the coupling halves.

Figs. 5 and 6, show a coupling with plain sockets not bushed with insulation.

Figs. 7, is a detail end view of tilting bar of Fig. 5, with cross-section of coupling halves leather bushed.

Fig. 8, shows a position of the tilting bar tilted when coupling halves are not in alinement.

Fig. 9, shows one position of tilting bar when rotative axes of the coupling halves make an angle with each other and illustrates how the bar also tilts endwise as well as sidewise.

In the drawings 1 and 2 are the coupling halves which consist of hubs 3 and 4 and flanges 5 and 6.

In the faces of said halves are depressions or sockets, 7 and 8 which are bushed with insulation 9, preferably leather firmly cemented in place.

In these sockets is placed a tilting bar 10 made of any material sufficiently strong but preferably steel with a smooth surface.

In half 1 the socket 7, 7, is entirely bushed on sides, bottom and ends, but in the other half 2 the bushing is on the sides and bottom of the socket 8, 8, but not as thick or not at all on the ends 11, as shown in Figs. 1 and 3.

In Figs. 5 and 6 the halves 12 and 13 are alike each with an unbushed elongated socket 14 in which the tilting bar 15 having its sides undercut as shown in Figs. 5 and 7 may tilt from its outer edges without jamming in the unbushed sockets.

Insulation in this case may be obtained by making the bar of insulating material such as hard fiber or else a metal bar covered with insulation.

The bar is not as long as the sockets and can slide longitudinally therein to a limited extent, which provides flexibility in a direction longitudinal with the bar; flexibility in a transverse direction being provided by the tilting or rocking of the bar as shown in Fig. 8.

In Figs. 1 and 2, the bar is shown approximately as long as the bushed socket 7, 7, in order to keep the said bar central and balanced for high rotative speeds, the longitudinal flexibility being obtained by the half 2 sliding on the bar, the socket 8, 8, of 2 having spaces at its ends 11, see Fig. 1, to allow such longitudinal movement. There may however be some longitudinal motion of bar in 1 from its looseness therein and the compressibility of the bushing.

In small couplings it is convenient to use a depression or socket 14, as shown in Figs. 5 and 6, but in larger sizes, to save material and weight, it is desirable to cut away the sides of the socket in the middle, as shown in Figs. 2 and 3, leaving the spaces 16 and 17, thus forming brackets or lugs 18, 19, 20 and 21, against which the bar bears at its ends. 7, 7 is thus considered a single elongated socket, as is also 8, 8.

The effective pressure, in this coupling, being greatest at the ends of the tilting bar, there is no sacrifice of strength or efficiency, by thus reducing the weight.

In Fig. 7, there is shown a tilting bar 15 undercut from near its edges to make the inclined surfaces 24 and to cause said bar to be widest at or near its outer edges. The coupling halves 22 and 23 have sockets bushed with a compressible insulation such as leather and the pressure between the coupling halves and the bar causes the bushings to be compressed to conform to the shape of the bar, making the sockets wider at the bottom than at the top, as shown; therefore when pressure is exerted on the inclined surfaces by the transmission of power from one half to the other half through the tilting bar (Fig. 7, shows 23 driving 22), the tendency of the bar is to keep to the bottom of the sockets, since otherwise it must ride up on the inclined surfaces of the bushings.

The resultant tendency, therefore, is for the coupling halves in operation to hug each other and not separate.

My coupling has universal flexibility for the three disalinements as follows:

First—When the shafts are parallel but not in line, there occurs during a rotation, two motions of the tilting bar with relation to the coupling halves; one or both halves slide longitudinally on the bar and at the same time said bar rocks or tilts in the socket. (See Fig. 8.) Thus free movement perpendicular to the rotative axes, limited in extent by the dimensions of the parts is provided.

Second—When the rotative axis of one shaft crosses the other making an angle therewith and both are in the same plane.

In this case, shown in Fig. 9, the bar need not slide longitudinally or tilt on its sides as in Fig. 8, but each end of the bar moves in and out of the coupling halves, or tilts on its ends in the sockets proportionately as the shafts are out of alinement.

These movements occur as each end of the bar approaches and draws away from the positions in the rotation where the flanges are nearest and farthest away from each other. (See Fig. 9.)

Third—When the rotative axes are not parallel and are not in the same plane. In this case there is a combination of the movements of the other two cases.

The two movements transverse to the rotative axes, one of which is transverse to the other, are provided for by the sliding and tilting of the bar as previously described, and the movements required for flexibility on account of the angularity of the axes, are provided for by the end tilting of the bar, as shown in Fig. 9. All of which movements may take place simultaneously.

Movement of the halves toward and away from each other, is also provided for by the slide of the bar in its sockets.

The bushings may be oil or paraffin soaked to furnish lubrication and make them waterproof.

Having thus described my invention, what I claim as new and desire to secure by Letters Patent is:

1. In a flexible shaft coupling, the combination of two coupling halves each having a socket in its face and a tilting bar normally held in both said sockets, said bar arranged and proportioned to slide in the sockets in a direction crosswise the rotative axes of said halves and to tilt both sidewise and endwise to thereby furnish flexibility between the halves.

2. In a flexible shaft coupling, the combination of two coupling halves each having an elongated socket in its face arranged crosswise its rotative axis and an elongated tilting bar normally held in both said sockets, said bar arranged and proportioned to slide in the sockets in directions both longitudinal and transverse to rotative axes of the coupling halves and to tilt both endwise and sidewise in said sockets to thereby furnish universal flexibility between said coupling halves.

3. In a flexible shaft coupling the combination of two coupling halves each having an elongated socket in its face and a tilting bar with sides cut to get greater width at its outer edges, normally held in said sockets, said bar arranged and proportioned to slide in said sockets longitudinally to itself and crosswise the rotative axes of said coupling halves and to furnish flexibility between said halves.

4. In a flexible shaft coupling the combination of two coupling halves each having an elongated socket in its face, a compressible and resilient bushing fixed to and lining said sockets and a tilting bar normally held in said sockets crosswise the axes of said halves and arranged to bear against the bushings to form resilient bearing surfaces, said tilting bar also movable longitudinally to itself and the bushed sockets and to tilt in said sockets, all arranged to furnish flexibility between the halves.

In testimony whereof I affix my signature in presence of two witnesses.

GEORGE R. BALDWIN.

Witnesses:
DAVID H. HALL,
WM. W. GATES.